US007450544B2

(12) United States Patent
Rue

(10) Patent No.: US 7,450,544 B2
(45) Date of Patent: Nov. 11, 2008

(54) APPARATUS AND METHOD FOR SUPPORTING MOBILITY BETWEEN SUBNETWORKS OF MOBILE NODE IN WIRELESS LAN

(75) Inventor: Seon-Soo Rue, Seoul (KR)

(73) Assignee: Samsung Electronics Co., Ltd., Suwon-si, Gyeonggi-do (KR)

(*) Notice: Subject to any disclaimer, the term of this patent is extended or adjusted under 35 U.S.C. 154(b) by 1417 days.

(21) Appl. No.: 10/358,284

(22) Filed: Feb. 5, 2003

(65) Prior Publication Data
US 2003/0185172 A1 Oct. 2, 2003

(30) Foreign Application Priority Data
Mar. 27, 2002 (KR) ............................ 2002-0016742

(51) Int. Cl.
*H04Q 7/00* (2006.01)
(52) U.S. Cl. .................. 370/331; 370/338; 370/352; 370/349; 370/332; 370/342; 455/442; 455/436; 455/437
(58) Field of Classification Search ................ 370/338, 370/352, 349, 331, 332, 342
See application file for complete search history.

(56) References Cited

U.S. PATENT DOCUMENTS

| 5,724,346 | A | | 3/1998 | Kobayashi et al. | |
|---|---|---|---|---|---|
| 5,991,287 | A | * | 11/1999 | Diepstraten et al. | ......... 370/338 |
| 6,006,090 | A | | 12/1999 | Coleman et al. | |
| 6,061,563 | A | | 5/2000 | Lee | |
| 6,188,681 | B1 | | 2/2001 | Vesuna | |
| 6,360,264 | B1 | | 3/2002 | Rom | |
| 6,473,413 | B1 | * | 10/2002 | Chiou et al. | ................ 370/331 |
| 6,477,156 | B1 | | 11/2002 | Ala-Laurila et al. | |
| 6,687,252 | B1 | * | 2/2004 | Bertrand et al. | ............. 370/401 |
| 6,738,362 | B1 | * | 5/2004 | Xu et al. | ..................... 370/329 |
| 6,771,623 | B2 | * | 8/2004 | Ton | ............................. 370/331 |
| 6,771,962 | B2 | * | 8/2004 | Saifullah et al. | ............ 455/436 |
| 6,826,154 | B2 | * | 11/2004 | Subbiah et al. | ............. 370/236 |
| 6,831,915 | B1 | * | 12/2004 | Beyschlag et al. | .......... 370/352 |
| 6,940,847 | B1 | * | 9/2005 | Glitho et al. | ................ 370/352 |

(Continued)

FOREIGN PATENT DOCUMENTS

WO    WO 01/99457 A1    12/2001

(Continued)

*Primary Examiner*—Marceau Milord
(74) *Attorney, Agent, or Firm*—Robert E. Bushnell, Esq.

(57) ABSTRACT

Disclosed in the present invention is a method for supporting mobility of a mobile node between subnetworks in a wireless local area network that includes a plurality of subnetworks networked through Internet and assigns a different Internet protocol (IP) address to the plural subnetworks, respectively, the method comprising the steps of: if the mobile node moves arbitrarily to a second subnetwork from a first subnetwork during communication, broadcasting a first message, in which a foreign mobile access server (MAS) of the second subnetwork includes the mobile node's medium access control (MAC) address; acquiring, at a home mobile access server of the first subnetwork, an address of the foreign mobile access server from the first message, and then transmitting a second message including an address of the home mobile access server and an Internet protocol address of the mobile node to the foreign mobile access server in reply to the first message; and routing, at the foreign mobile access server and the home mobile access server, the mobile node's data by using the other party's address.

20 Claims, 6 Drawing Sheets

U.S. PATENT DOCUMENTS

| | | | |
|---|---|---|---|
| 6,954,790 B2 * | 10/2005 | Forslow | 709/227 |
| 6,961,774 B1 * | 11/2005 | Shannon et al. | 709/227 |
| 6,970,443 B2 * | 11/2005 | Dynarski et al. | 370/338 |
| 6,973,057 B1 * | 12/2005 | Forslow | 370/328 |
| 6,980,802 B2 * | 12/2005 | Jung | 455/436 |
| 6,987,743 B2 * | 1/2006 | Chen et al. | 370/328 |
| 7,042,864 B1 * | 5/2006 | Leung et al. | 370/338 |
| 7,068,640 B2 * | 6/2006 | Kakemizu et al. | 370/349 |
| 7,088,694 B1 * | 8/2006 | Rune | 370/331 |
| 7,103,359 B1 * | 9/2006 | Heinonen et al. | 455/436 |
| 7,106,710 B1 * | 9/2006 | Smith | 370/331 |
| 7,130,629 B1 * | 10/2006 | Leung et al. | 455/435.1 |
| 7,152,238 B1 * | 12/2006 | Leung et al. | 726/2 |
| 7,155,518 B2 * | 12/2006 | Forslow | 709/227 |
| 7,248,572 B2 * | 7/2007 | Bender et al. | 370/338 |
| 7,313,628 B2 * | 12/2007 | Chaskar et al. | 709/238 |

FOREIGN PATENT DOCUMENTS

| | | |
|---|---|---|
| WO | WO 02/17670 A1 | 2/2002 |

\* cited by examiner

APPARATUS AND METHOD FOR SUPPORTING MOBILITY BETWEEN SUBNETWORKS OF MOBILE NODE IN WIRELESS LAN

CLAIM OF PRIORITY

This application makes reference to, incorporates the same herein, and claims all benefits accruing under 35 U.S.C. §119 from my application APPARATUS AND METHOD FOR PROVIDING MOBILITY OF MOBILE NODE AMONG THE SUB-NETWORKS IN WIRELESS LOCAL AREA NETWORK filed with the Korean Industrial Property Office on Mar. 27, 2002 and there duly assigned Serial No. 16742/2002.

BACKGROUND OF THE INVENTION

1. Technical Field

The present invention relates generally to wireless local area network (WLAN), and more particularly to an apparatus and a method for supporting mobility of a mobile node between foreign subnetworks in the local area network.

2. Related Art

A subnetwork will be presumed to be a small network unit that is divided by a gateway in a private network. Typically, a mobility of a mobile node is supported within the same subnetwork only, and the applied technology thereof has been supported by using medium access control (MAC) level data on Ethernet or 802.3, but not through mobility support on IP (Internet Protocol).

A mobile node in a wireless local area network can correspond to a mobile computer such as a notebook computer, laptop computer, tablet computer, hand-held computer, wearable computer, or other type of portable computer device. Also, a mobile node in a wireless local area network can correspond to a mobile telephone, a pager, a text-messaging device, a communication unit such as a semiconductor chip for communications, or other type of portable communication apparatus.

A mobile node can correspond to any unit that can be in communication with a wireless network. A mobile node may be known by many different names, such as mobile terminal, mobile computing device, mobile station, remote unit, mobile unit, or a mobile user station, for example.

A mobile node communicates with a wireless local area network (WLAN) using a network interface card (NIC). Access points manage wireless resources in a subnetwork of a wireless local area network. The access points exchange information with a mobile node through a wireless link. A mobile access server controls access points, and supports signal protocol, for example, call set and call release. A mobile access server (MAS) includes a gateway for communication with Internet and/or Intranet.

It is my observation that it can be difficult, inconvenient, inefficient and/or unnecessarily complicated to move a mobile node between subnetworks of a wireless local area network.

SUMMARY OF THE INVENTION

The present invention provides an improved apparatus and method that enables a mobile node to be conveniently moved from a first subnetwork in a wireless local area network (WLAN) to a second subnetwork in the wireless local area network.

The present invention provides an apparatus and a method for supporting mobility of a mobile node between foreign subnetworks within a wireless local area network.

The present invention provides the method for supporting mobility of a mobile node between subnetworks in a wireless local area network that includes a plurality of subnetworks networked through Internet and assigns a different Internet protocol (IP) address to each of the plural subnetworks, the method comprising: when the mobile node moves arbitrarily to a second subnetwork from a first subnetwork during communication, broadcasting a first message, in which a foreign mobile access server (MAS) of the second subnetwork includes the mobile node's medium access control (MAC) address or/and previous access point address; acquiring, at a home mobile access server of the first subnetwork, an address of the foreign mobile access server from the first message, and transmitting a second message including an address of the home mobile access server and an Internet protocol address of the mobile node to the foreign mobile access server in reply to the first message; and routing, at the foreign mobile access server and the home mobile access server, the mobile node's data by using the other party's address.

In accordance with the principles of the present invention, as embodied and broadly described, the present invention provides a method of communication for a mobile node, the method comprising: moving a mobile node from a first subnetwork to a second subnetwork, the first and second subnetworks being subnetworks in a wireless local area network, the first and second subnetworks being networked to each other through the Internet, the first subnetwork being assigned a first Internet protocol address, the second subnetwork being assigned a second Internet protocol address different from the first Internet protocol address; broadcasting a first message from a second mobile access server of the second subnetwork, the first message including a medium access control address of the mobile node; acquiring an address of the second mobile access server from the first message, said acquiring being performed by a first mobile access server of the first subnetwork; transmitting a second message from the first mobile access server to the second mobile access server in response to the first message, the second message including an address of the first mobile access server and an Internet protocol address of the mobile node; and when the mobile node is in the second subnetwork, routing first data from the mobile node through the second mobile access server and then through the first mobile access server.

In accordance with the principles of the present invention, as embodied and broadly described, the present invention provides a handover processing method for a mobile node, the method comprising: moving a mobile node from a first subnetwork to a second subnetwork, the first and second subnetworks being subnetworks in a wireless local area network, the first and second subnetworks being networked to each other through the Internet, the first and second subnetworks not being assigned the same Internet protocol address; transmitting a handover request message from an access point of the second subnetwork to a second mobile access server of the second subnetwork, the handover request message including a medium access control address of the mobile node; broadcasting a first message from the second mobile access server in response to the handover request message, the first message including a medium access control address of the mobile node; when a second message is received in response to the first message, acquiring an address of a first mobile access server of the first subnetwork and an Internet protocol address of the mobile node from the second message; and when the mobile node is in the second subnetwork, routing data from the mobile node through the address of the first mobile access server.

In accordance with the principles of the present invention, as embodied and broadly described, the present invention provides a handover processing method for a mobile node, the method comprising: moving a mobile node from a first subnetwork to a second subnetwork, the first and second subnetworks being subnetworks in a wireless local area network, the first and second subnetworks being networked to each other through the Internet, the first and second subnetworks not being assigned the same Internet protocol address; receiving a first message at a first mobile access server of the first subnetwork, the first message including an address of the first mobile node; acquiring an address of a second mobile access server of the second subnetwork from the first message received, said acquiring being performed by the first mobile access server; transmitting a second message to the second mobile access server in dependence upon said acquiring of the address of the second mobile access server, the second message including an address of the first mobile access server and an Internet protocol of the mobile node; and routing data from the mobile node through the address of the second mobile access server acquired by the first mobile access server.

In accordance with the principles of the present invention, as embodied and broadly described, the present invention provides an apparatus for mobile communications, the apparatus comprising: a first subnetwork being in a wireless local area network, being in communication with the Internet, and being assigned a first Internet protocol address; a second subnetwork being in the wireless local area network, being in communication with the Internet, and being assigned a second Internet protocol address different from the first Internet protocol address; a foreign mobile access server being mounted in said second subnetwork and broadcasting a first message including a medium access control address of a mobile node when the mobile node moves to said second subnetwork from said first subnetwork; and a home mobile access server being mounted in said first subnetwork, acquiring an address of said foreign mobile access server from the first message, said home mobile access server transmitting a second message in response to the first message, the second message including an address of said home mobile access server and an Internet protocol address of the mobile node to said foreign mobile access server; said foreign mobile access server routing first data from the mobile node to the home mobile access server; said home mobile access server routing second data through the foreign mobile access server and then to the mobile node.

The present invention is more specifically described in the following paragraphs by reference to the drawings attached only by way of example. Other advantages and features will become apparent from the following description and from the claims.

BRIEF DESCRIPTION OF THE DRAWINGS

In the accompanying drawings, which are incorporated in and constitute a part of this specification, embodiments of the invention are illustrated, which, together with a general description of the invention given above, and the detailed description given below, serve to exemplify the principles of this invention.

DESCRIPTION OF EMBODIMENTS FOR CARRYING OUT THE INVENTION

While the present invention will be described more fully hereinafter with reference to the accompanying drawings, in which details of the present invention are shown, it is to be understood at the outset of the description which follows that persons of skill in the appropriate arts may modify the invention here described while still achieving the favorable results of this invention. Accordingly, the description which follows is to be understood as being a broad, teaching disclosure directed to persons of skill in the appropriate arts, and not as limiting upon the present invention.

Illustrative embodiments of the invention are described below. In the interest of clarity, not all features of an actual implementation are described. In the following description, well-known functions, constructions, and configurations are not described in detail since they could obscure the invention with unnecessary detail. It will be appreciated that in the development of any actual embodiment numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill having the benefit of this disclosure.

Figure 1:
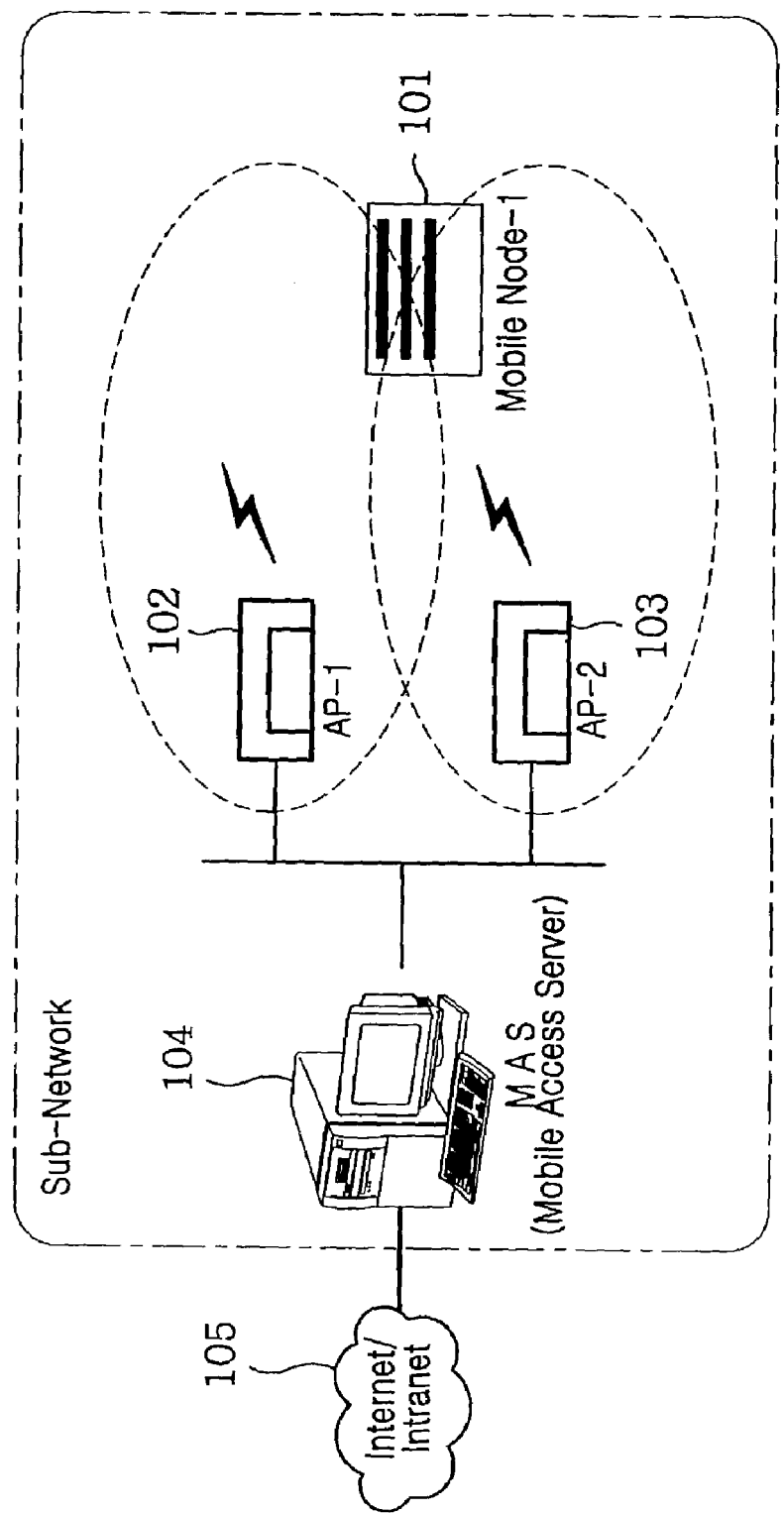
FIG. 1 is a schematic diagram of a lower subnetwork in an exemplary wireless local area network.

FIG. 1 depicts the configuration of a lower subnetwork in an exemplary wireless local area network. The subnetwork includes a mobile node 101, access points (AP) 102 and 103, and 8 a mobile access server (MAS) 104. Referring to FIG. 1, mobile node 101 indicates a mobile node that is in communication with a wireless local area network (WLAN) through the use of a network interface card (NIC). Access points 102, 103 manage wireless resources, and practically, exchange information with a mobile node through a wireless link. Mobile access server 104 controls access points, and supports signal protocol, for example, call set and call release. Moreover, the mobile access server 104 includes a gateway (not shown) for communication with Internet/Intranet 105.

Figure 2:
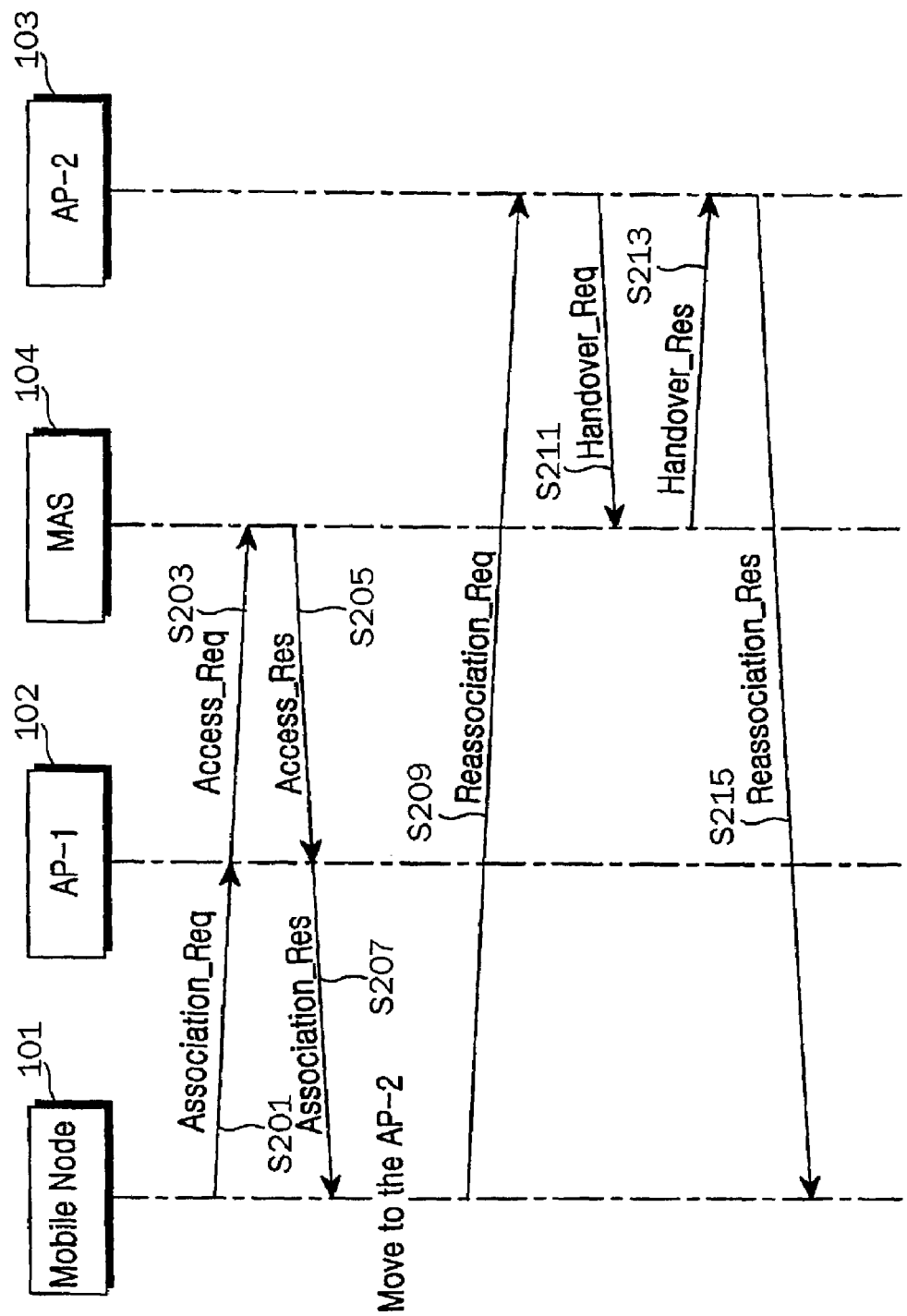
FIG. 2 depicts an exemplary flow of supporting mobility within one subnetwork in a wireless local area network.

A mobile node can be handed off from a first access point 102 to a second access point 103 in the one subnetwork having the above-described configuration. However, the mobile node cannot be handed off to a different subnetwork. The flow or procedure for supporting mobility within the same one subnetwork is depicted in FIG. 2. Namely, FIG. 2 is a flow chart of handover procedure concerned in a case where a mobile node moves from the first access point's service area to the second access point's service area, in one subnetwork.

Referring to FIG. 2, at step S201, the mobile node 101 transfers an association request message (Association_Req) to a first access point 102 for communication with the first access point 102. Then, at step S203, the first access point 102 transfers an access request message (Access_Req) to the mobile access server 104 to inform that the mobile node wants an association. Having received the Access_Req, the mobile access server 104 confirms whether a location move request message for the mobile node is normal, and updates the location data related to the mobile node and then updates a service pass (message routing information) for the mobile node, thereby performing data transmission concerning the mobile node. At step S205, the mobile access server 104 sends an access response message (Access_Res) to the first access point 102 in reply to the Access_Req. At step S207, the first access point 102 transmits an association response message (Association_Res) to the mobile node 101 in reply to the Association_Req. Once the association is set in such manner, the mobile node 101 performs communication through the first access point 102.

If the mobile node moves to another access point, that is, a second access point, that is within the same one subnetwork, the mobile node 101 concludes that the signal intensity of the first access point has been weakened, and scans another new access point until it acquires a signal of the second access point 103. At step S209, the mobile node 101 transmits a reassociation request message (Reassociation_Req) to the second access point 103, and the second access point 103 transmits a handover request message (Handover_Req) to the mobile access server 104. Then, the mobile access server 104 updates data on location registration (Location_registration) of the mobile node, and changes the data path to the mobile node, namely from the first access point to the second access point. At step S211, the second access point 103 transmits a handover request message (Handover_Res). At step S213, the mobile access server 104 transmits a handover response message (Handover_Res) to the second access point 103 in reply to the Handover_Req. Later, at step S215, the second access point 103 sends a reassociation response message (Reassociation_Res) to the mobile node 101 to notify that the handover has been completed. In this way, the handover is duly completed, and the mobile node 101 can perform communication through the second access point 103.

It is my observation that there is currently a lack of convenient and efficient support for a mobility of a mobile node. Efforts have been made to improve features related to mobile terminals.

Exemplars of recent efforts in the art are disclosed, for example, in U.S. Pat. No. 6,447,156 to Ala-Laurila et al., entitled APPARATUS AND ASSOCIATED METHOD FOR SELECTABLY OPERATING RADIO DEVICE 1 ALTERNATE OPERATING MODE, issued on Nov. 5, 2002, U.S. Pat. No. 6,473,413 to Chiou et al., entitled METHOD FOR INTER-IP-DOMAIN ROAMING ACROSS WIRELESS NETWORKS, issued on Oct. 29, 2002, U.S. Pat. No. 6,360,264 to Rom, entitled METHOD AND APPARATUS FOR MAINTAINING CONNECTIVITY OF NODES IN A WIRELESS LOCAL AREA NETWORK, issued on Mar. 19, 2002, U.S. Pat. No. 6,188,681 to Vesuna, entitled METHOD AND APPARATUS FOR DETERMINING ALTERNATIVE SECOND STATIONARY ACCESS POINT IN RESPONSE TO DETECTING IMPEDED WIRELESS CONNECTION, issued on Feb. 13, 2001, U.S. Pat. No. 6,061,563 to Lee, entitled METHOD OF MOVING STATION IN WIRELESS LAN, issued on May 9, 2000, U.S. Pat. No. 6,006,090 to Coleman et al., entitled PROVIDING ROAMING CAPABILITY FOR MOBILE COMPUTERS IN A STANDARD NETWORK, issued on Dec. 21, 1999, and U.S. Pat. No. 5,724,346 to Kobayashi et al., entitled MEANS FOR MAINTAINING CONNECTABLE ACCESS POINTS OWING TO MOVEMENT OF A MOBILE STATION BETWEEN CELLS IN A WIRELESS LAN SYSTEM, issued on Mar. 3, 1998.

While these contemporary efforts contain merit/significance/value, it is my observation that further improvements can also be contemplated.

Some products may support mobility in the same subnetwork. That is, some products may support handover between access networks in the one network using the same gateway. However, it is my observation that those products do not provide an adequately improved method and apparatus for conveniently and efficiently supporting mobility between foreign subnetworks.

In an attempt to discuss and solve the problem related to a handoff from one subnetwork to a different subnetwork, "Mobile IPv4" could be considered. "Mobile IPv4" is mobile Internet protocol, version 4. However, the mobile node should be supported with mobility as well, in order to support the "Mobile IPv4". That is, the "Mobile IPv4" cannot be used in the absence of support for the mobile node. Another possible problem concerned here is that it takes too much time to convert the data path because the mobile access server should have a "Mobile Agent" including home agent (HA)/foreign agent (FA) to support mobility, and a tunneling structure should be implemented between those two agents.

Hence, it is my observation that a new, improved, convenient, and efficient scheme for supporting mobility of a mobile node between foreign subnetworks is needed, which does not have to be as complicated as the "Mobile IPv4" or changing the mobile node.

Described below is the technology for supporting mobility of a mobile node between foreign subnetworks within a private network, for example, a wireless local area network. Here, the term "subnetwork" means a small network unit that is divided by a gateway. Here, a mobile node can communicate with a second node through the Internet. Here, the second node, also known as a communication node, can be any node or terminal or unit that is connected to the Internet and that is in communication with the mobile node. When data is sent from the mobile node to the communication node, the communication node is the destination node. When data is sent from the communication node to the mobile node, the communication node is the origination node.

Figure 3:
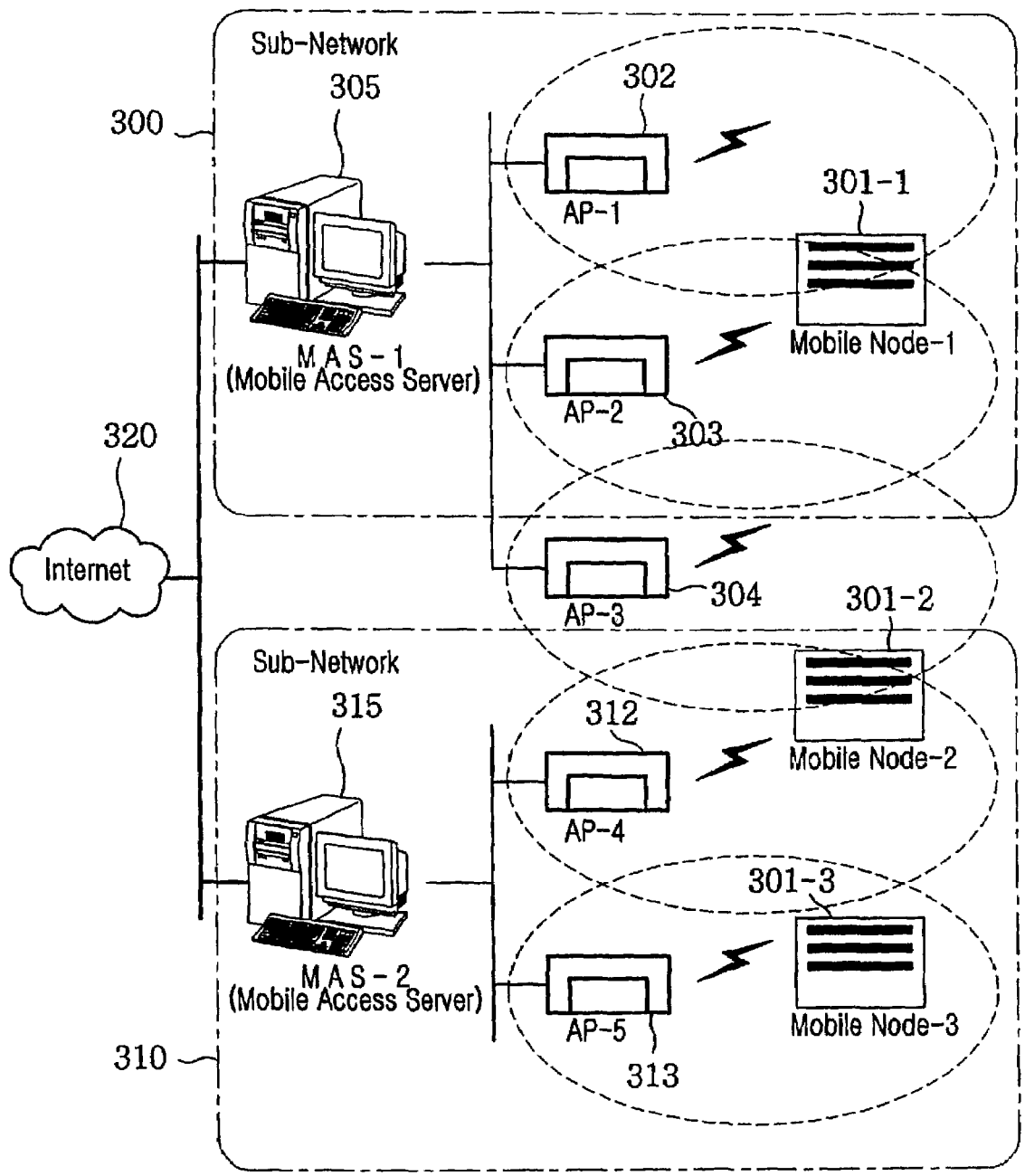
FIG. 3 is a schematic diagram of a wireless local area network including a plurality of subnetworks, in accordance with the principles of the present invention.

FIG. 3 is a schematic diagram of a wireless local area network including a plurality of subnetworks, in accordance with the principles of the present invention. As shown in the drawing, a first subnetwork 300 includes a first access point (AP) 302, a second access point 303, a third access point 304, and a first mobile access server (MAS) 305. A second subnetwork 310 includes a fourth access point 312 and a fifth access point 313. Here, the first mobile access server 305 and the second mobile access server 315 are networked through the Internet 320.

The mobile nodes 301-1, 301-2, and 301-3 indicate mobile nodes mounted with a wireless local area network using network interface card (NIC). The access points 302, 303, 304, 312, and 313 manage wireless resources, and practically exchange information with mobile nodes through a wireless link. The access points basically support bridge function between a wired local area network and a wireless local area network, and forward request messages from a mobile node to a mobile access server (MAS).

Mobile access server 305 controls the first access point 302, the second access point 303, and the third access point 304. Another mobile access server 315 controls the fourth access point 312 and the fifth access point 313. Here, the mobile access servers 305 and 315 support a plurality of protocols (call setup, call release, mobility, management, and security), and manage information on the access points and the mobile node, and perform data path switching and Internet protocol assignment. Also, the mobile access servers 305 and 315 include a gateway (not shown) for communicating with Internet 320.

Figure 4:
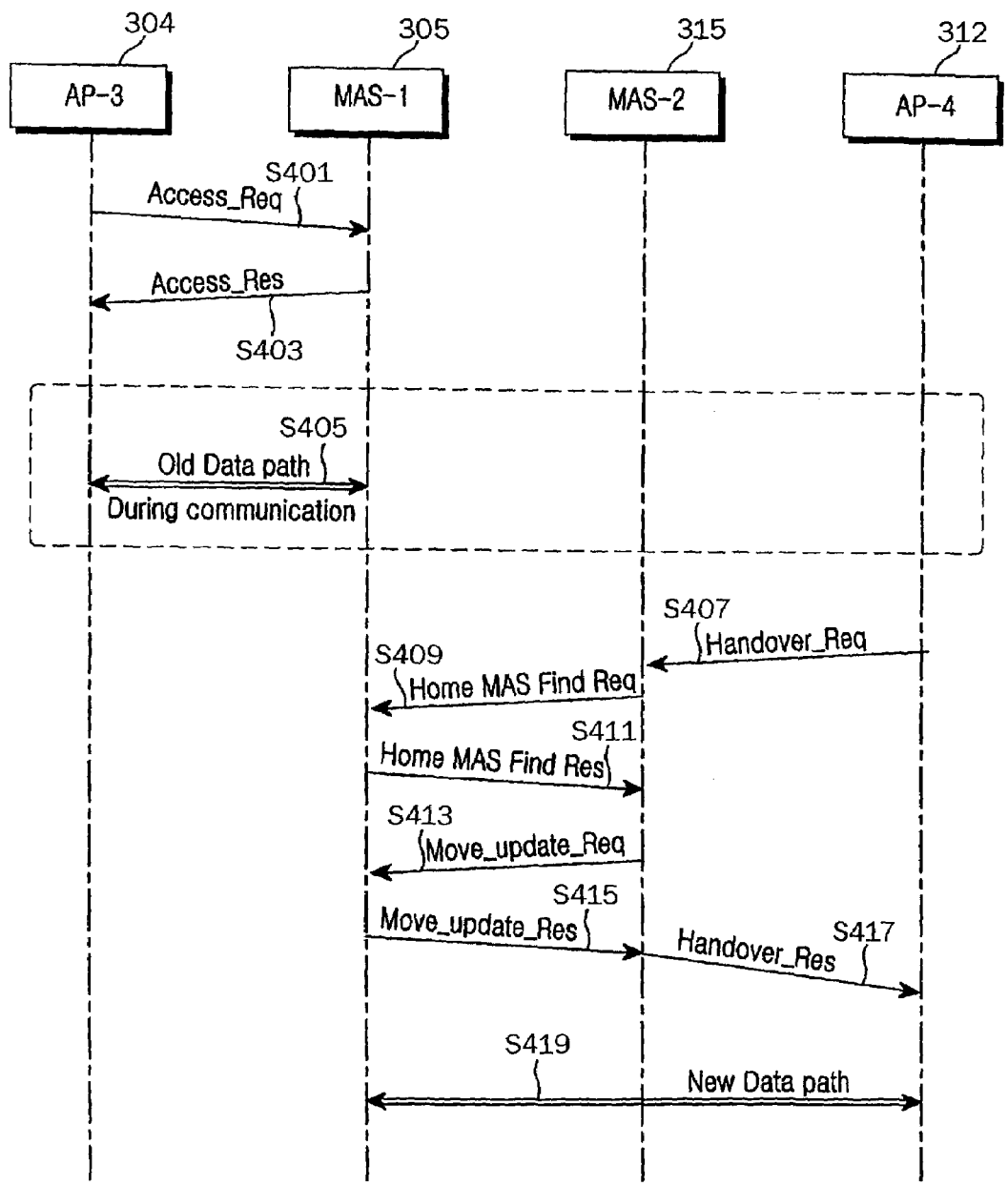
FIG. 4 diagrammatically depicts signal messages that are exchanged between components when a mobile node moves to a foreign subnetwork from home subnetwork in the wireless local area network, in accordance with the principles of the present invention.

The following explains the operation based on the above-described constitution. FIG. 4 diagrammatically depicts signal messages that are exchanged between components when a mobile node moves to a foreign subnetwork from home subnetwork in the wireless local area network, in accordance with the principles of the present invention. FIG. 4 shows handover procedure, or flow, when a mobile node moves from the third access point 304 service area of the first subnetwork 300 to the fourth access point 312 service area of the second subnetwork 310.

The first mobile access server 305 can be referred to as the home mobile access server 305. The second mobile access server 315 can be referred to as the foreign mobile access server 315.

At step S401, with reference to FIG. 4, the third access point 304, having received an association request from the mobile node 301-2, transmits an access request message (Access_Req) to the first mobile access server 305 for notifying that the mobile node 301-2 has requested an association. After receiving the Access_Req, the first mobile access server 305 updates management data for communicating, and allows the service to the mobile node. And, at step S403, the first mobile access server 305 transmits an access response (Access_Res) to the third access point 304 in reply to the Access Req. Then, the third access point 304 transmits a response to the Association_Req to the mobile node 301-2. At step S405, when the association is set, the mobile node 301-2 performs communication through the third access point 304 and the first mobile access server 305.

If the mobile node 301-2 moves to the service area of the fourth access point 312 while communicating with a second node or communication node through the Internet 320, the mobile node 301-2 concludes that the signal intensity of the third access point 304 has been weakened, and scans for another access point until it acquires a signal of the fourth access point 312. The mobile node 301-2 transmits a reassociation request message (Reassociation_Req) to the fourth access point 312. At step S407, the fourth access point 312 transmits a handover request message (Handover_Req) from the mobile node 301-2 to the second mobile access server 315.

The Handover_Req includes a physical address, for example, medium access control (MAC) address, and/or the Internet protocol address of the third access point 304 for identifying the mobile node 301-2. The second mobile access server 315, having received the Handover_Req, checks to determine whether the information on the mobile node 301-2 is stored in its own database.

At step S409, when it turns out that there is no such information, the second mobile access server 315 broadcasts Home mobile access server (MAS) Find request message to surrounding mobile access servers (for example, the first mobile access server 305) to acquire the Internet protocol address of the mobile node 301-2. An arbitrarily defined protocol can be used for the Home mobile access server (MAS) Find request message broadcast from the second 18 mobile access server 315. Also, reverse address resolution protocol (RARP) can be used for the Home mobile access server (MAS) Find request message broadcast from the second mobile access server 315. The reverse address resolution protocol (RARP) maps a hardware address, such as a medium access control address, to an Internet address.

The Home mobile access server (MAS) Find request message broadcast from the second mobile access server 315 can include the medium access control (MAC) address of the mobile node 301-2. At step S411, the first mobile access server 305 that received the Home mobile access server (MAS) Find request message transfers a Home mobile access server (MAS) Find response message including the medium access control (MAC) address and Internet protocol address of the first mobile access server 305 to the second mobile access server 315. At this point, the second mobile access server 315 acquires the medium access control (MAC) address and Internet protocol address of the Home mobile access server (MAS) 305, and the Internet protocol address of the mobile node 301-2.

At step S413, to update the information for supporting mobility, the second mobile access server 315 requests the first mobile access server 305 to update the information for supporting mobility. At step S415, the first mobile access server 305 responds to the update request.

In this way, information in connection with authentication between mobile access servers 305 and 315 and the mobile node 301-2, which are required for mobility, can be updated. At step S417, the second mobile access server 315 transmits a response message to the fourth access point 312 in reply to the Handover_Req, and terminates the handover. At step S419, once the handover is terminated, the mobile node 301-2 performs communication through the fourth access point 312, the second mobile access server 315, and the first mobile access server 305 on the newly established data path.

Figure 5:
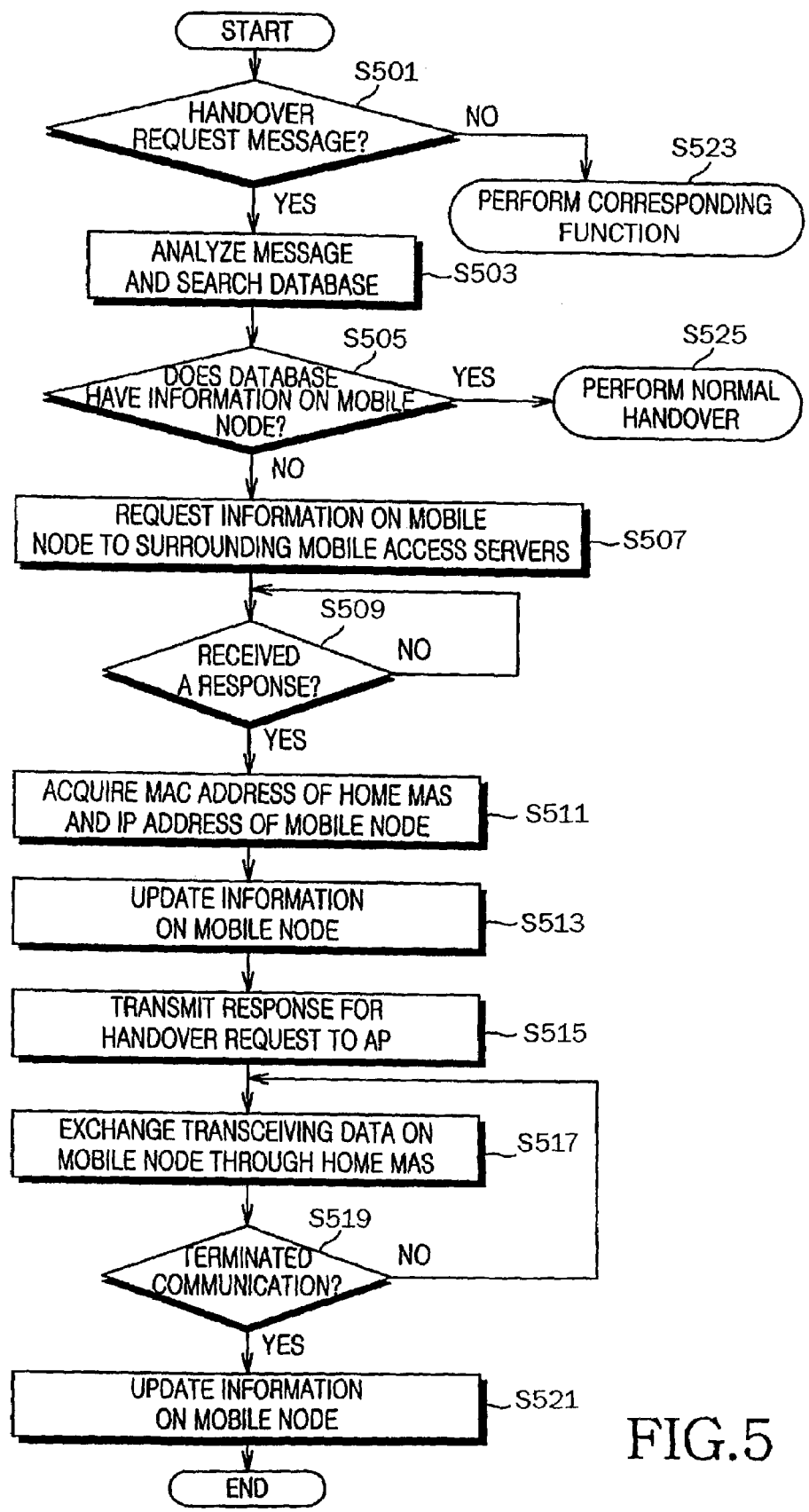
FIG. 5 is a flow chart illustrating handover that is performed by a foreign mobile access server (MAS), in accordance with the principles of the present invention.

FIG. 5 is a flow chart illustrating handover that is performed by a foreign mobile access server (MAS), in accordance with the principles of the present invention. Here, the foreign mobile access server (MAS) 315 is an mobile access server in a new location to which a mobile node moved, and the Home mobile access server 305 is a mobile access server through which a mobile node made an initial Association_request.

At step S501, with reference to FIG. 5, the foreign mobile access server (MAS) 315 finds out if a Handover_Req from a lower access point has been received. At step S523, when the Handover_Req has not been received, the foreign mobile access server 315 performs a relevant or appropriate function corresponding to the circumstances. At step S503, when the Handover_Req has been received, the foreign mobile access server 315 analyzes the Handover_Req received from the access point.

At step S505, the foreign mobile access server 315, by referring to the medium access control (MAC) address of the mobile node 301-2 included in the Handover_Req, checks to determine whether information about the mobile node 301-2 is stored in its own database. At step S525, if the information exists, the foreign mobile access server 315 performs a normal handover. At step S507, however, if there is no such information, the foreign mobile access server 315 broadcasts a Home mobile access server (MAS) Find request message to surrounding mobile access servers (that is, the first mobile access server 305) for acquiring the Internet protocol address of the mobile node 301-2.

At step S509, after broadcasting the Home mobile access server (MAS) Find request message, the foreign mobile access server 315 checks to determine whether a response message to the Home mobile access server (MAS) Find request message has been received. At step S511, if the Home mobile access server (MAS) Find request message has been received, the foreign mobile access server 315 acquires the medium access control (MAC) address and Internet protocol address of the Home mobile access server 305, and also acquires the Internet protocol address of the mobile node 301-2 from the response message.

Afterwards, the foreign mobile access server 315 requests the Home mobile access server to update information on the mobile node's location/route. At step S513, the foreign mobile access server 315 updates information in the database in connection with authentication between mobile access servers 305 and 315 and the mobile node 301-2 that are required for mobility.

At step S515, after updating the information for supporting mobility, the foreign mobile access server 315 transmits a response message (that is, Handover_Res) to the fourth access point 312 in reply to the Handover_Req to terminate the handover. At step S517, transceiving data is exchanged on mobile node 301-2 through home MAS 305. That is, at step S517, once the handover is terminated, the foreign mobile access server 315 exchanges transceiving data for the mobile node 301-2 through the Home mobile access server 305.

When the mobile node 301-2 was in the area of the first subnetwork 300, the mobile node 301-2 had established a communication path with a second node or communication node, the communication node was connected to the Internet 320, and data was being transmitted from the mobile node 301-2 through the access point 304, the home mobile access server 305, the Internet 320, and to the communication node. Also, data was being transmitted from the communication node through the Internet 320, the home mobile access server 305, the access point 304, and to the mobile node 301-2.

At step S517, the mobile node 301-2 has been moved to the area of the second subnetwork 310, the mobile node 301-2 has established a new communication path with the communication node, the communication node is still connected to the Internet 320, and data is being transmitted from the mobile node 301-2 through the access point 312, the foreign mobile access server 315, the home mobile access server 305, the Internet 320, and to the communication node. Also, data is being transmitted from the communication node through the Internet 320, through the home mobile access server 305, through the foreign mobile access server 315, through the access point 312, and to the mobile node 301-2.

The transmitted data from the mobile node 301-2 is sent to the other party or destination node, also known as the communication node, through the fourth access point 312, the foreign mobile access server 315, and the Home mobile access server 305. And, the data being transmitted from the other party or communication node is sent back to the mobile node 301-2 through the Home mobile access server 305, the foreign mobile access server 315, and the fourth access point 312.

Later, at step S519, the foreign mobile access server 315 checks to determine whether the communication for the mobile node 301-2 has been terminated. At step S521, when the communication for the mobile node 301-2 has been terminated, the foreign mobile access server 315 updates information on the mobile node 301-2 that has been stored in the database, and the whole procedure is finished here.

Figure 6:
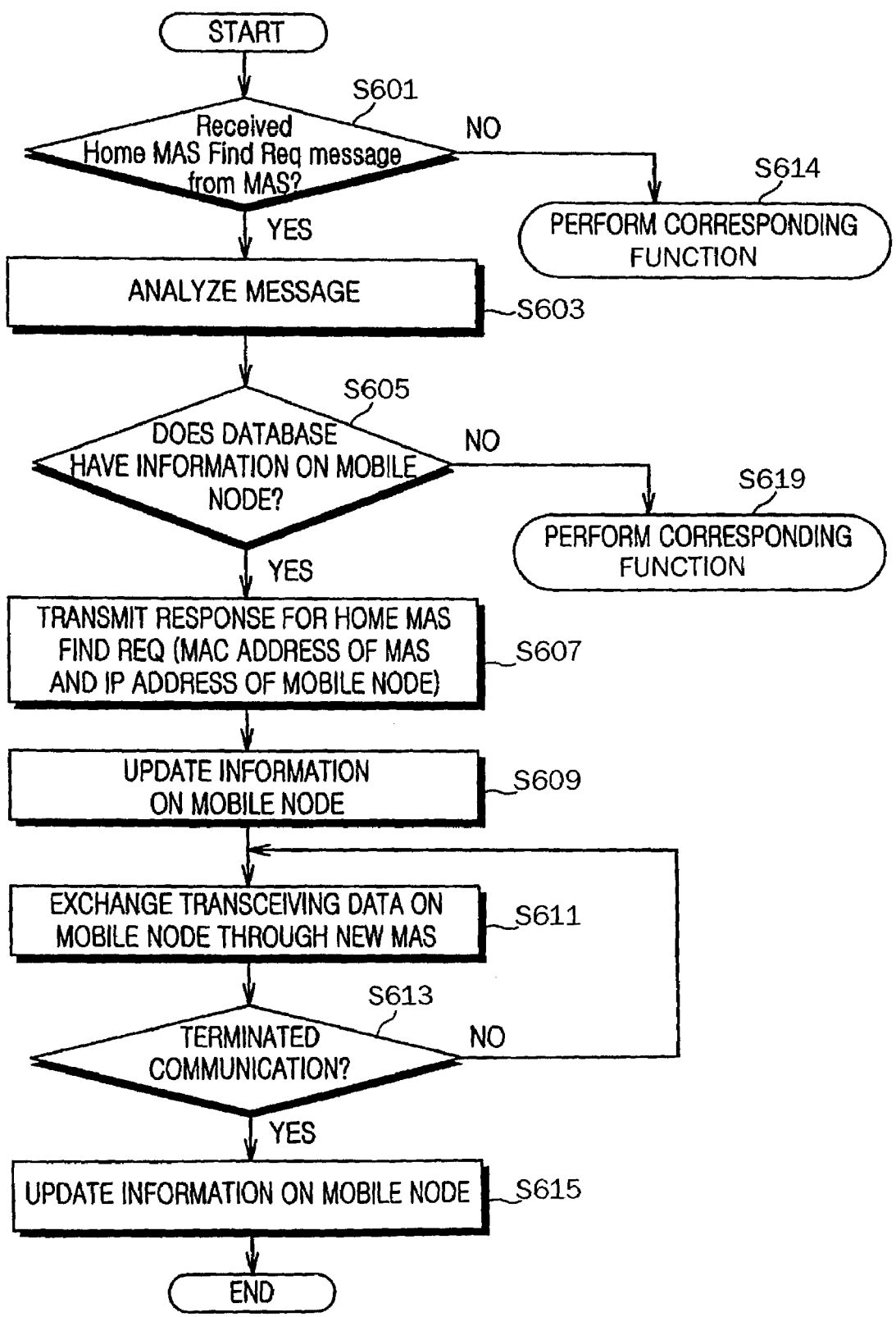
FIG. 6 is a flow chart illustrating handover that is performed by a home mobile access server, in accordance with the principles of the present invention.

FIG. 6 is a flow chart illustrating handover that is performed by a home mobile access server, in accordance with the principles of the present invention. With reference to FIG. 6, at step S601, the Home mobile access server (MAS) 305 checks to determine whether the Home mobile access server (MAS) Find Request, requesting the Internet protocol address of a particular mobile node, has been received from an arbitrary mobile access server (MAS) through the Internet 320.

At step S617, when the Home mobile access server (MAS) Find Request message has not been received, the Home mobile access server 305 performs a function corresponding to the circumstances. At step S603, when the message has been received, the Home mobile access server 305 analyzes the received message and, based on this analysis, it acquires the physical address, that is, the medium access control (MAC) address, for identifying the particular mobile node and also information on the server that transmitted the Home mobile access server Find Request message, that is, the medium access control (MAC) address, the Internet protocol address, and other information. As mentioned before, the particular mobile node is presumed to be the mobile node 301-2.

At step S605, based on the medium access control (MAC) address of the mobile node 301-2 obtained at step S603, the Home mobile access server 305 checks to determine whether there is information on the mobile node 301-2 in its own database. At step S619, when there is no such information, the Home mobile access server 305 performs a corresponding function appropriate for the circumstances.

At step S607, when there is the information on the mobile node 301-2, the Home mobile access server 305 acquires the mobile node's Internet protocol address from the database, and generates a response to the Home mobile access server Find Request, and transmits the response. Here, the response message includes information on the Internet protocol address of the mobile node 301-2 and the medium access control (MAC) address of the Home mobile access server.

At step S609, later, the Home mobile access server 305 updates the information for supporting mobility of the mobile node 301-2 at the request of the foreign mobile access server 315. In other words, the Home mobile access server 305 updates the mobile node's location registration information.

At step S611, the Home mobile access server 305 exchanges transceived data on the mobile node 301-2 through the foreign mobile access server 315. More specifically, the transmitted data from the mobile node 301-2 is sent to the other party, also referred to as the communication node, through the fourth access point 312, the foreign mobile access server 315, and the Home mobile access server 305, and the data being transmitted from the other party is sent back to the mobile node 301-2 through the Home mobile access server 305, the foreign mobile access server 315, and the fourth access point 312.

At step S613, the foreign mobile access server 315 checks to determine whether the communication for the mobile node 301-2 has been terminated. At step S615, when the communication has been terminated between the mobile node 301-2 and the communication node, the Home mobile access server 305 updates information on the mobile node 301-2 in the database, and ends the whole procedure.

In conclusion, the present invention introduces a method for supporting a mobile node's mobility through access points and mobile access servers only, without using a complicated protocol or making additional changes in the mobile node. In addition, the present invention advantageously changes a data routing path to a new access point by figuring out the motion of the mobile node at a medium access control layer.

While the present invention has been illustrated by the description of embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details, representative apparatus and method, and illustrative examples shown and described. Accordingly, departures may be made from such details without departing from the spirit or scope of the applicant's general inventive concept.

What is claimed is:

1. A method of communication for a mobile node, the method comprising:

moving a mobile node from a first subnetwork to a second subnetwork, the first and second subnetworks being subnetworks in a wireless local area network, the first and second subnetworks being networked to each other through the Internet, the first subnetwork being assigned a first Internet protocol address, the second subnetwork being assigned a second Internet protocol address different from the first Internet protocol address;

broadcasting a first message from a second mobile access server of the second subnetwork, the first message including a medium access control address of the mobile node;

acquiring an address of the second mobile access server from the first message, said acquiring being performed by a first mobile access server of the first subnetwork;

transmitting a second message from the first mobile access server to the second mobile access server in response to the first message, the second message including an address of the first mobile access server and an Internet protocol address of the mobile node; and when the mobile node is in the second subnetwork, routing first data from the mobile node through the second mobile access server and then through the first mobile access server.

2. The method of claim 1, the first message conforming to reverse address resolution protocol.

3. The method of claim 1, further comprising:

routing second data through the first mobile access server and then through the second mobile access server and then to the mobile node.

4. The method of claim 1, said broadcasting of the first message being performed when the mobile node is communicating with a second node during said moving.

5. The method of claim 4, the first data being routed to the second node after being routed through the first mobile access server.

6. The method of claim 5, further comprising:

when the mobile node is in the second subnetwork, routing second data from the second node through the first mobile access server and then through the second mobile access server and then to the mobile node.

7. The method of claim 6, the first message conforming to reverse address resolution protocol.

8. The method of claim 7, the first subnetwork and the first mobile access server corresponding to a home subnetwork and a home mobile access server, respectively, the second subnetwork and the second mobile access server corresponding to a foreign subnetwork and a foreign mobile access server, respectively.

9. A handover processing method for a mobile node, the method comprising:

moving a mobile node from a first subnetwork to a second subnetwork, the first and second subnetworks being subnetworks in a wireless local area network, the first and second subnetworks being networked to each other through the Internet, the first and second subnetworks not being assigned the same Internet protocol address;

transmitting a handover request message from an access point of the second subnetwork to a second mobile access server of the second subnetwork, the handover request message including a medium access control address of the mobile node;

broadcasting a first message from the second mobile access server in response to the handover request message, the first message including a medium access control address of the mobile node;

when a second message is received in response to the first message, acquiring an address of a first mobile access server of the first subnetwork and an Internet protocol address of the mobile node from the second message; and when the mobile node is in the second subnetwork, routing data from the mobile node through the address of the first mobile access server.

10. The method of claim 9, said transmitting of the handover request message being performed when the mobile node is communicating with a second node during said moving.

11. The method of claim 10, the data being routed to the second node after being muted through the first mobile access server.

12. The method of claim 11, the first message conforming to reverse address resolution protocol.

13. A handover processing method for a mobile node, the method comprising:

moving a mobile node from a first subnetwork to a second subnetwork, the first and second subnetworks being subnetworks in a wireless local area network, the first and second subnetworks being networked to each other through the Internet, the first and second subnetworks not being assigned the same Internet protocol address;

receiving a first message at a first mobile access server of the first subnetwork, the first message including an address of the first mobile node;

acquiring an address of a second mobile access server of the second subnetwork from the first message received, said acquiring being performed by the first mobile access server;

transmitting a second message to the second mobile access server in dependence upon said acquiring of the address of the second mobile access server, the second message including an address of the first mobile access server and an Internet protocol of the mobile node; and routing data from the mobile node through the address of the second mobile access server acquired by the first mobile access server.

14. The method of claim 13, the address of the first mobile node included in the first message being a medium access control address.

15. The method of claim 14, the first subnetwork corresponding to a home subnetwork for the mobile node, the second subnetwork corresponding to a foreign subnetwork for the mobile node.

16. An apparatus for mobile communications, the apparatus comprising:

a first subnetwork being in a wireless local area network being in communication with the internet, and being assigned a first internet protocol address;

a second subnetwork being in the wireless local area network, being in communication with the Internet, and being assigned a second internet protocol address different from the first internet protocol address;

a foreign mobile access server being mounted in said second subnetwork and broadcasting a first message including a medium access control address of a mobile node when the mobile node moves to said second subnetwork from said first subnetwork; and a home mobile access server being mounted in said first subnetwork, acquiring an address of said foreign mobile access server from the first message, said home mobile access server transmitting a second message in response to the first message, the second message including an address of said home mobile access server and an Internet protocol address of the mobile node to said foreign mobile access server;

said foreign mobile access server routing first data from the mobile node to the home mobile access server;

said home mobile access server muting second data through the foreign mobile access server and then to the mobile node.

17. The apparatus of claim 16, the routing of the first data from the mobile node to the home mobile access server being performed when the mobile node is in the second subnetwork.

18. The apparatus of claim 17, the routing of the second data through the foreign mobile access server and then to the mobile node being performed when the mobile node is in the second subnetwork.

19. The apparatus of claim 16, the first message being broadcast only when the mobile node is in communication with a second node when the mobile node is moved to said second subnetwork.

20. The apparatus of claim 19, said home mobile access server receiving the second data from the second node, the first data being routed to the second node from said home mobile access server.

* * * * *